United States Patent Office 3,594,450
Patented July 20, 1971

3,594,450
THERMOPLASTIC POLYESTER MOULDING COMPOSITIONS CONTAINING DIENE-ACRYLATE COPOLYMER
Walter Herwig and Ludwig Brinkmann, Frankfurt am Main, Germany, assignors to Farbwerke Hoechst Aktiengesellschaft vormals Meister Lucius & Brüning, Frankfurt am Main, Germany
No Drawing. Filed July 16, 1968, Ser. No. 745,114
Claims priority, application Germany, Aug. 30, 1967, F 53,355
Int. Cl. C08g 39/04
U.S. Cl. 260—873    10 Claims

ABSTRACT OF THE DISCLOSURE

Thermoplastically workable moulding compositions of particularly high impact strength, comprising a mixture of saturated linear polyesters with copolymers of conjugated aliphatic dienes and acrylic acid esters.

---

The present invention relates to thermoplastic moulding compositions.

It has been proposed to mould thermoplastic moulding compositions containing linear saturated polyesters of aromatic dicarboxylic acids into shaped articles. Shaped articles made of unmodified polyethylene terephthalate have only an unsatisfactory dimensional stability since they shrink with uncontrollable deformation when being heated at elevated temperatures. Various measures have been proposed to modify polyethylene terephthalate in order to obtain shaped articles which are dimensionally stable. In German Pat. 1,182,820 it has been described, for example, to mix polyesters of saturated aliphatic diols and saturated aromatic dicarboxylic acids, advantageously polyethylene terephthalate, with high-polymer propylene or high-polymer 4-methylpentene-1. The dimensional stability of shaped articles made of these moulding compositions is indeed improved as compared with unmodified polyethylene terephthalate but it is still unsatisfactory for many applications. It has furthermore been described in Netherlands Specification 6,511,744 to mix polyethylene terephthalate with finely divided, solid inorganic substances in order to increase the speed of crystallization in the mould of the injection-moulded polyester composition. These moulding compositions yield dimensionally stable shaped articles the impact strength of which is, however, unsatisfactory for special applications.

The present invention provides thermoplastic moulding compositions consisting of a mixture of (a) A linear saturated polyester of an aromatic dicarboxylic acid and optionally a small amount of an aliphatic dicarboxylic acid with a saturated aliphatic or cycloaliphatic diol and (b) A copolymer of an ester of acrylic, methacrylic or ethacrylic acid and a saturated aliphatic alcohol with a conjugated aliphatic diene, the copolymer being added in an amount within the range of 0.05 to 25%, advantageously 0.5 to 10%, calculated on the total weight of the mixture.

It is surprising that the impact strength of the polyesters thus modified is increased, without the hardness and abrasion resistance being impaired.

The moulding compositions in accordance with the invention may contain nucleating agents which are known to increase the speed of crystallization of the polyester composition and impart a good degree of crystallization to the polyester shaped article. Shaped articles having a good degree of crystallization are dimensionally stable even above the second order transition temperature and do not shrink. Finely divided inorganic substances which are insoluble in the moulding composition, for example, calcium carbonate, aluminum silicate and talc, may be used in known manner as nucleating agents.

It is surprising that the moulding compositions of the invention may also be made into shaped articles of good dimensional stability without the use of a nucleating agent. The shaped articles are also dimensionally stable at temperatures above the second order transition temperature. Polyethylene glycol terephthalate is advantageously used as linear saturated polyester of an aromatic dicarboxylic acid. Other polyesters, for example polycyclohexane-1,4-dimethylol terephthalate, may likewise be used. It is also possible to use modified polyethylene terephthalates which, in addition to terephthalic acid, contain also other aromatic or aliphatic dicarboxylic acids, for example, naphthalene-dicarboxylic acid-2,6 or adipic acid, as basic units. Modified polyethylene terephthalates containing, in addition to ethylene glycol, also other aliphatic diols, for example neopentyl glycol or butanediol-1,4 may also be used as diol components.

The polyesters advantageously have a reduced specific viscosity dl./g. within the range of from 0.6 to 2.0, preferably 0.9 to 1.0 and 1.4 to 1.6, determined in a 1% solution in a 60:40 mixture of phenol and tetrachlorethane at 25° C.

It is also possible to start from polyesters having a lower reduced specific viscosity and to obtain the desired higher viscosity by an after-condensation during the mixing process. Alternatively, the desired higher viscosity may be imparted to the moulding composition by subjecting the latter in known maner to an after-condensation in the solid phase.

The polyester is mixed with a copolymer of a conjugated diene with an acrylic, methacrylic or ethacrylic acid ester. These copolymers are obtained according to known processes.

As conjugated dienes there are used compounds of the general formula

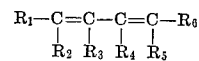

in which radicals $R_1$ to $R_6$ represent hydrogen atoms or alkyl groups with 1 to 4 carbon atoms, $R_1$ and $R_2$ or $R_5$ and $R_6$ being hydrogen atoms.

The acrylic acid esters to be used in accordance with the invention correspond to the general formula

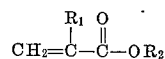

in which $R_1$ stands for a hydrogen atom or the group $CH_3$ or $C_2H_5$, and $R_2$ is an alkyl group with 1 to 12 carbon atoms.

The copolymers of diene and acrylic acid ester may be of varying compositions. They may, for example, contain the monomers in a statistical distribution, or they may be block polymers or graft polymers.

In general, the content of diene in the copolymer of diene and acrylic acid ester is advantageously at most 95% by weight and that of the acrylic acid ester is advantageously also at most 95% by weight.

Products containing 90 to 40% by weight of conjugated diene are particularly suitable.

It is advantageous to use copolymers of butadiene with acrylic acid ester, preferably with acrylic acid butyl ester.

The copolymers should have a mean molecular weight $M_w$ of at least 5000 and advantageously of above 50,000.

The amount of copolymer added may be within the range of 0.05 to 25%, advantageously 0.5 to 10%, calculated on the total weight of the mixture.

The copolymer of diene and acrylic acid ester may be introduced into the polyester mass in various ways. The copolymer may be admixed, for example, with the polyester melt by stirring vigorously. Alternatively, the granular or pulverulent polyester may be admixed as uniformly as possible with the copolymer, the resulting mixture may be melted in an extruder, extruded while cooling and then granulated.

The moulding composition advantageously contains as little moisture as possible, advantageously less than 0.01% by weight.

In order to keep the moisture uptake low the granulated moulding composition may be coated with a coating of an inert hydrophobic substance, for example paraffn or wax.

To obtain crystalline or partially crystalline shaped articles, the moulding temperature should lie sufficiently above the second order transition temperature of the polyester material used. The shaped articles obtained from the moulding compositions of the invention are distinguished by having a particularly high impact strength, a good surface hardness, a good abrasion resistance and a low moisture uptake.

The following examples serve to illustrate the invention, but are not intended to limit it, the parts being by weight.

EXAMPLE 1

3980 g. of polyethylene terephthalate powder (reduced specific viscosity 1.43 dl./g., determined in a 1% strength solution in a 60:40 mixture of phenol and tetrachlorethane at 25° C.), having a particle size distribution of 100 to 750µ, were mixed with 20 g. of a copolymer of 90 parts of butadiene and 10 parts of acrylic acid butyl ester, having an average molecular weight $M_w$ of 100,000, homogenized in an extruder and subsequently granulated. The moulding composition was dried in vacuo first for 2 hours at 100° C. and then for 5 hours at 180° C.

Sheets of dimensions 60x60x1 mm., having a good dimensional stability were injection moulded from the resulting polyester moulding composition at a mould temperature of 150° C. After a moulding time of 15 seconds, the sheets already had a density of 1.377. The impact strength of the sheets was tested by a drop test in which the test sheets were exposed to an impact stress by allowing a falling hammer sliding on low-friction tracks to drop vertically from various heights onto a test sheet clamped in a frame. The tip of the dropping hammer represented a hemisphere having a radius of 10 mm. 10 sheets were tested for each height.

In a comparison test, polyethylene terephthalate powder to which no copolymer of butadiene and acrylic acid butyl ester had been added, was admixed with 0.2% by weight of aluminum silicate powder (47% $SiO_2$, 38% $Al_2O_3$; 75% having a particle size below 2µ), homogenized in an extruder and granulated.

The granular product was subsequently dried in vacuo first for 2 hours at 100° C., and then for 5 hours at 180° C. Further processing and testing was carried out as described above. The results of the drop test are summarized in the table below.

EXAMPLE 2

3980 g. of polyethylene terephthalate powder (reduced specific viscosity 1.43 dl./g., determined in a 1% strength solution in a 60:40 mixture of phenol and tetrachlorethane at 25° C.), having a particle size distribution of 100 to 750µ, were mixed with 20 g. of a copolymer of 55 parts of butadiene and 45 parts of acrylic acid butyl ester, having a mean molecular weight $M_w$ of 100,000, homogenized in an extruder and subsequently granulated. The resulting moulding composition was dried in vacuo first for 2 hours at 100° C., and then for 5 hours at 180° C. The material was processed and tested as described in Example 1. The results of the drop test are indicated in the table.

TABLE

| Polyester | Copolymer admixed | Amount added in percent by weight | Drop height F 20, in cm[1] |
|---|---|---|---|
| Polyethylene terephthalate. | Butadiene-acrylic acid butyl ester according to Example 1. | 0.5 | 125 |
| Polyethylene terephthalate (Example 1). | | | 60 |
| Polyethylene terephthalate. | Butadiene-acrylic acid butyl ester according to Example 2. | 0.5 | 115 |

[1] Height in cm. at which the impact energy sufficed to produce fracture in 20% of the sheets.

What is claimed is:
1. Thermoplastic moulding compositions consisting of a mixture of
   (a) a linear saturated polyester of polyethylene glycol terephthalate, polycyclohexane-1,4 - di-methylol terephthalate, modified polyethylene terephthalates which contain as an acid precursor thereof naphthalene-dicarboxylic acid-2,6 or adipic acid, or modified polyethylene terephthalates which contain as a glycol modifier neopentyl glycol or butanediol - 1,4 wherein said polyester has a reduced specific viscosity from 0.6 to 2.0 dl./g. as measured in a 1% solution in a 60:40 mixture of phenol and tetrachloroethane at 25° C.;
   (b) a copolymer of an ester of acrylic, methacrylic or ethacrylic acid and an aliphatic alcohol with a conjugated aliphatic diene, the copolymer in said mixture being in an amount within the range of 0.5 to 25% calculated on the total weight of the mixture wherein the aliphatic diene is a compound of the general formula

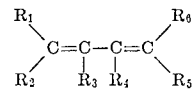

in which the radicals $R_1$ to $R_6$ represent hydrogen atoms or alkyl groups with 1 to 4 carbon atoms in which $R_1$ and $R_2$ or $R_5$ and $R_6$ may be hydrogen atoms, and wherein the acrylic acid ester is a compound of the general formula

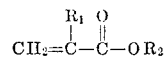

in which $R_1$ is H, $CH_3$ or $C_2H_5$ and R is an alkyl radical with 1 to 12 carbon atoms, wherein the copolymer has an average molecular weight about 5,000, and wherein neither the content of the diene nor the content of acrylic acid ester in the copolymer exceeds 95% by weight.

2. A thermoplastic moulding composition as claimed in claim 1 wherein the copolymer has an average molecular weight of above 50,000.

3. A thermoplastic moulding composition as claimed in claim 1 wherein the saturated linear polyester is polyethylene glycol-terephthalate.

4. A thermoplastic moulding composition as claimed in claim 1 wherein the saturated linear polyester is polycyclohexane-1,4-dimethylol-terephthalate.

5. A thermoplastic moulding composition as claimed in claim 1 wherein the saturated linear polyester contains, in addition to terephthalic acid, also naphthalene-dicarboxylic acid-2,6.

6. A thermoplastic moulding composition as claimed in claim 1 which contains, in addition to terephthalic acid also adipic acid.

7. A thermoplastic moulding composition as claimed in claim 1 wherein the content of diene in the copolymer is within the range of from 90 to 40% by weight.

8. A thermoplastic moulding composition as claimed in claim 1 wherein the copolymer is a copolymer of butadiene and acrylic acid butyl ester.

9. A thermoplastic moulding composition as claimed in claim 1 wherein aluminum silicate powder calcium carbonate or talcum is used as nucleating agent.

10. Shaped articles made of the thermoplastic moulding compositions claimed in claim 1.

References Cited

UNITED STATES PATENTS

| | | | |
|---|---|---|---|
| 2,643,247 | 6/1953 | Fisher et al. | 260—79.5 |
| 3,290,411 | 12/1966 | Tsuji et al. | 260—873 |
| 3,388,083 | 6/1968 | Kwok | 260—17.4 |
| 3,405,198 | 10/1968 | Rein et al. | 260—873 |

MELVIN GOLDSTEIN, Primary Examiner

U.S. Cl. X.R.

117—100; 260—28.5; 264—328